United States Patent
Tomita (10) Patent No.: US 6,173,616 B1
(45) Date of Patent: Jan. 16, 2001

(54) ELECTROMAGNETIC FLOW-RATE MEASUREMENT SYSTEM

(75) Inventor: Toyofumi Tomita, Tokyo (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 08/985,284

(22) Filed: Dec. 4, 1997

(30) Foreign Application Priority Data

Dec. 4, 1996 (JP) .................................................... 8-324112

(51) Int. Cl.$^7$ .................................. G01F 1/60; G01F 1/58
(52) U.S. Cl. ........................................ 73/861.17; 73/861.12
(58) Field of Search ............................ 73/861.08, 861.11, 73/861.12, 861.16, 861.17; 340/603, 606, 618, 620

(56) References Cited

U.S. PATENT DOCUMENTS

| | | | |
|---|---|---|---|
| 4,373,400 | * 2/1983 | Sekiguchi | 73/861.12 |
| 4,408,497 | * 10/1983 | Suzuki | 73/861.17 |
| 4,409,846 | * 10/1983 | Ueno | 73/861.17 |
| 4,969,363 | * 11/1990 | Mochizuki | 73/861.17 |
| 5,388,465 | * 2/1995 | Okaniwa et al. | 73/861.17 |
| 5,487,310 | * 1/1996 | Higuchi | 73/861.17 |
| 5,677,496 | * 10/1997 | Mochizuki | 73/861.17 |

FOREIGN PATENT DOCUMENTS 0262658  4/1988 (EP).

\* cited by examiner

*Primary Examiner*—Benjamin R. Fuller
*Assistant Examiner*—Jagdish Patel
(74) *Attorney, Agent, or Firm*—Oblon, Spivak, McClelland, Maier & Neustadt, P.C.

(57) ABSTRACT

An electromagnetic flow-rate measurement system for measuring flow-rate values of a fluid is disclosed. Detection units measure the flow-rate values of the fluid. A meter board, which connects to the detection units via a common bus-line, collects the flow-rate values. The detection units include a first communications circuit which is connected between two ends of an exciting coil and server both to transmit flow-rate signals or cumulative flow-rate signals to a meter board in synchronization with an alternating waveform voltage of a common bus-line, and to receive signals from the meter board in synchronization with the alternating waveform voltage. The meter board encompasses a second communications circuit which is connected to the common bus-line and serves both to transmit signals to the plurality of detection units in synchronization with the alternating-current waveform voltage, and to receive signals from the detection units in synchronization with the alternating waveform voltage. The electromagnetic flow-rate measurement system facilitates remote centralized collection of data from a single meter board and can be applied, for example, to the detection of household water consumption.

9 Claims, 8 Drawing Sheets

ELECTROMAGNETIC FLOW-RATE MEASUREMENT SYSTEM

BACKGROUND TO THE INVENTION

1. Field of the Invention

The present invention relates to an electromagnetic flow-rate measurement system which is configured using electromagnetic flowmeters capable of measuring the flow of a conductive fluid.

2. Description of the Related Art

One of the pieces of measurement apparatus used for measuring the flow of conductive fluids is the electromagnetic flowmeter, the high degree of accuracy and durability of which has led to its wide adoption for use in industry.

Figure 1:
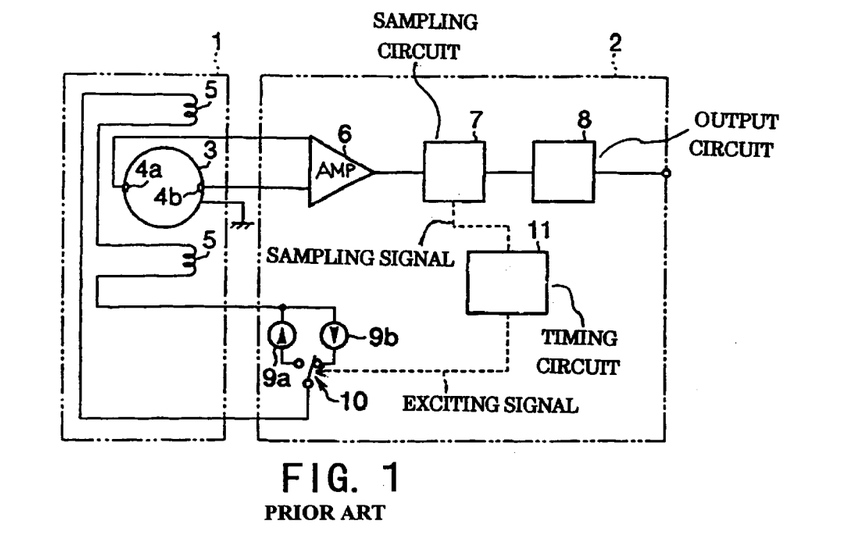
FIG. 1 is a diagram illustrating the general configuration of an electromagnetic flowmeter.

FIG. 1 shows an example of the configuration of an electromagnetic flowmeter for industrial use.

The electromagnetic flowmeter shown in this drawing comprises a detector 1 and a converter 2. The detector 1 has a pair of electrodes 4a, 4b on the internal wall of the measurement pipe 3 through which the conductive fluid which is to be measured is passed, and a flow-rate measurement coil 5 located on the exterior of the measurement pipe 3 impresses a magnetic field on the fluid in a direction which intersects at right-angles the line along which the electrodes 4a, 4b face each other. The converter 2 converts the electromotive force which is generated between the electrodes 4a, 4b into voltage signals in an amplifier 6, and outputs them from an output circuit 8 via a sampling circuit 7. A switch 10 serves to switch between constant-current sources 9a, 9b, thus allowing an alternating current to flow to the flow-rate measurement coil for the purpose of excitation. The switching of the switch 10 is controlled by a exciting signal which is generated by a timing circuit 11 in synchronisation with a sampling signal from the sampling circuit 7.

Figure 2:
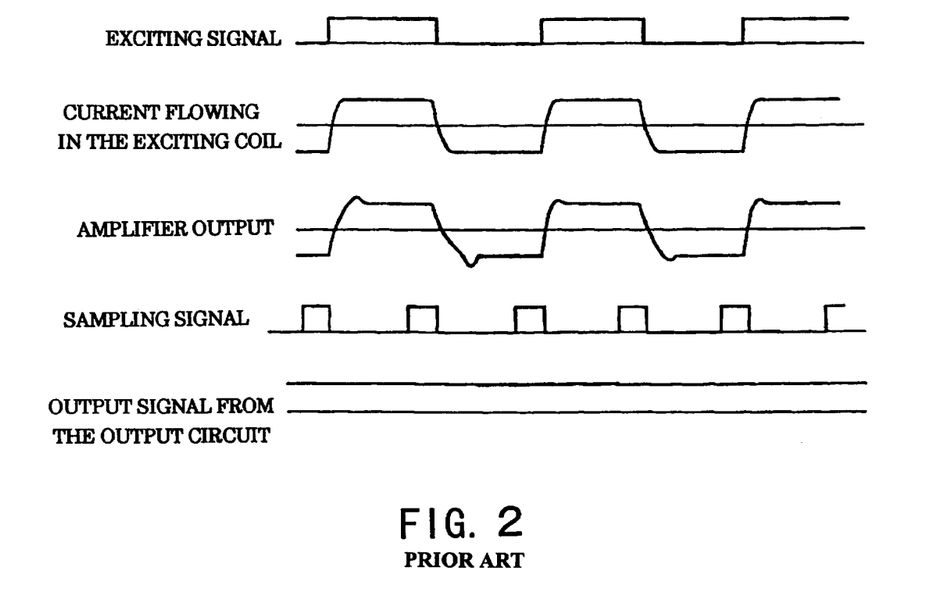
FIG. 2 is a timing chart for each part of the electromagnetic flowmeter illustrated in FIG. 1.

FIG. 2 illustrates the timing of the above-mentioned electromagnetic flowmeter.

Control of the switch 10 by means of the exciting signal illustrated in this drawing allows the alternating current to flow to the exciting coil 5, and the electromotive force generated between the electrodes 4 in accordance with the flow-rate of the fluid which is to be measured is amplified by the amplifier 6. The output of this amplifier 6 is sampled when stable, and a flow-rate signal is transmitted from the output circuit 8.

Another example of a device which measures the flow-rate of a fluid in the same way as an electromagnetic flowmeter is the water meter which measures the amount of water consumed for household use. Recent demand for the rationalisation of meter-reading and a reduction in the number of meters which are difficult to read has led to the popularisation of centralised and mass meter-reading, where meters are read from a distance by electrical or magnetic means.

If the industrial electromagnetic flowmeter could be adapted to use with the household water meter, it would be possible to implement a high-precision remote centralised meter-reading system. However, in practice there are a number of factors which have prevented the adaption of the electromagnetic flowmeter to use with household water meters. Some of the reasons which may be adduced are as follows. There has been a problem in that the faintness of the electromotive force (flow-rate signal) generated between the electrodes 4a, 4b has necessitated a complicated configuration of circuits (sampling circuit 7, output circuit 8 etc.) in order to process the signal in the converter 2. Another problem has been the high cost involved in providing the electrical energy to generate an alternating magnetic field by means of the flow-rate measurement coil 5, and the cost of the exciting circuit comprising the constant-current sources 9a, 9b and the switch 10. Yet another problem has been the increased cost of power consumption running to several watts as compared with other types of mechanical water meter. Finally, it has been necessary to renew wiring and other equipment because the detector 1 normally requires an external power source.

Recent developments in electronics technology have succeeded in facilitating signal processing on a cheaper and smaller scale, but the continued need for an exciting circuit and wiring to supply the required electric power mean that problems of size and expense still remain.

Thus, any attempts hitherto to construct a remote centralised meter-reading system or other flow-rate measurement system by adapting electromagnetic flowmeters to use with household water meters have been fraught with problems size and expense resulting from the need to provide the exciting circuit and wiring to supply the required electric power.

SUMMARY OF THE INVENTION

It is an object of the present invention, which has been devised in view of the circumstances outlined above, to provide a flow-rate measurement system which permits the implementation of a cheap, accurate and durable remote centralised meter-reading system for water meters by configuring it in such a manner that wiring installed for the purpose of remote meter-reading can be used to supply the required power sources for exciting and circuitry.

It is possible to achieve the object of the present invention with the aid of an electromagnetic flow-rate measurement system configured as is described below.

It is an electromagnetic flow-rate measurement system, wherein detection units located in a plurality of positions in order to measure a fluid are each connected by way of a common bus-line to a meter board, flow-rate values detected by each of the detection units being collected to the meter board.

The detection units are provided with a measurement pipe through which the fluid which is to be measured flows, electrodes attached to the interior wall of this measurement pipe in a latitudinal direction, an exciting coil which is connected to the common bus-line and imparts a magnetic field in a direction which intersects at right-angles the axial direction of the measurement pipe, an amplifier which serves to amplify the electromotive force generated between the electrodes, a sampling circuit which samples the output of this amplifier, a signal-processing circuit which takes flow-rate signals or cumulative flow-rate signals from the output of this sampling circuit, and a communications circuit which is connected to between the two ends of the exciting coil and serves both to transmit the flow-rate signals or cumulative flow-rate signals to the meter board in synchronization with an alternating waveform voltage of the common bus-line, and to receive signals from the meter board in synchronisation with the alternating waveform voltage.

The meter board is provided with an alternating waveform voltage-generating sources which are connected to the common bus-line and generates alternating waveform voltage, and a communications circuit which is connected to the common bus-line and serves both to transmit signals to the detection units in synchronisation with the alternating waveform voltage, and to receive signals from the detection units in synchronisation with the said alternating waveform voltage.

BRIEF DESCRIPTION OF THE DRAWINGS

A more complete appreciation of the invention and many of the attendant advantages thereof may readily be obtained as the same become better understood by reference to the following detailed description when considered in connection with the accompanying drawings, wherein.

DETAILED DESCRIPTION OF THE PREFERRED EMBODIMENT

Figure 3:
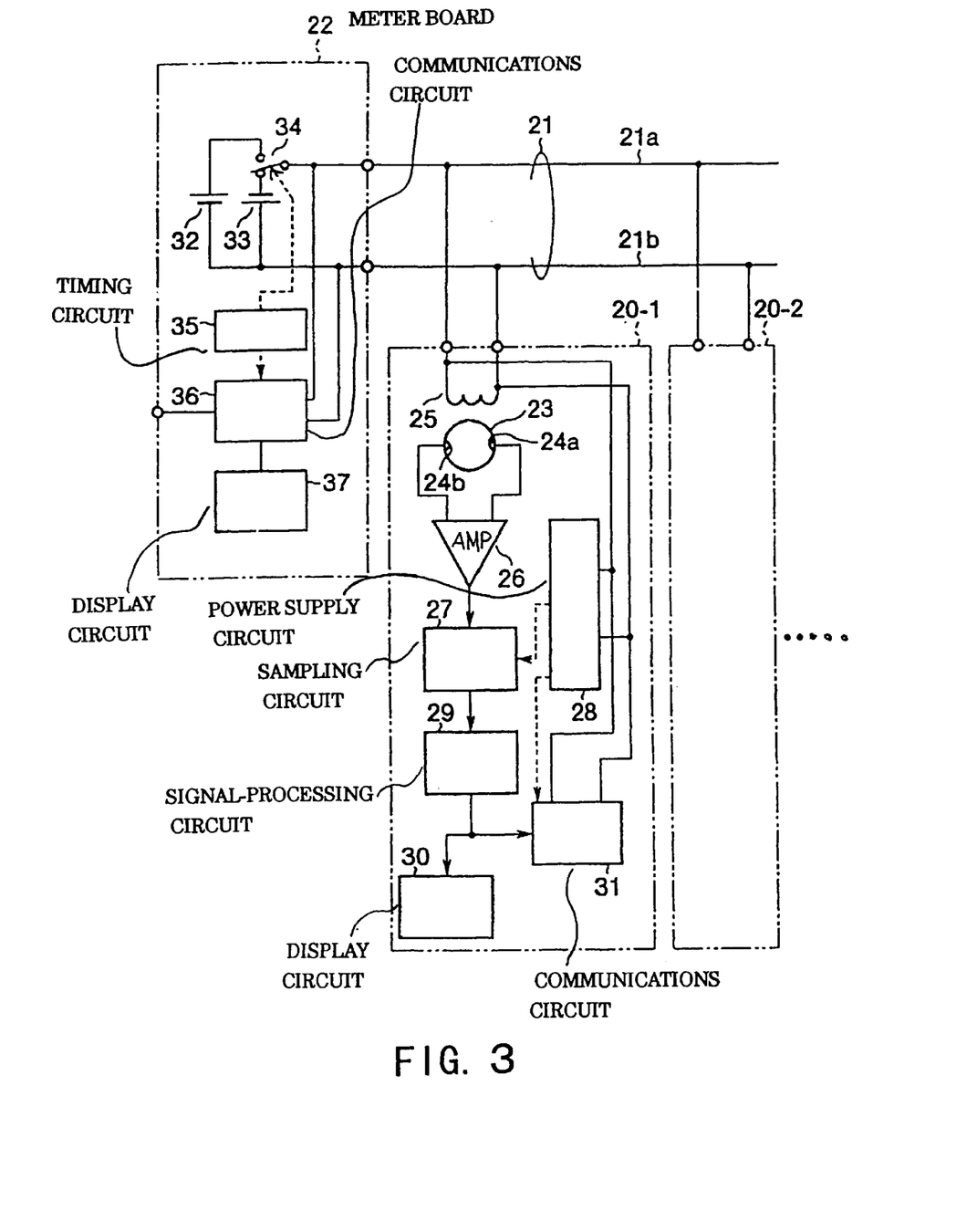
FIG. 3 is a block diagram illustrating the configuration of the first embodiment of the electromagnetic flow-rate measurement system to which the present invention pertains.

There now follows a description of one embodiment of the present invention with reference to the drawings, wherein like reference numerals denote identical or corresponding parts throughout the several views, and more particularly with reference to FIG. 3 thereof.

FIG. 3 illustrates the configuration of the flow-rate measurement system to which the present invention pertains.

This flow-rate measurement system has a common bus-line 21 between a plurality of detector units 20-1-20-n corresponding to water meters and including electromagnetic flowmeters, and a meter board 22 which serves these detector units 20-1-20-n. The bus-line 21 is of the 2-line type (21a, 21b).

The detector units 20 each have a pair of electrodes 24a, 24b which are located on the interior wall of a measurement pipe 23 through which the water or other fluid which is to be measured flows, and are able to come into contact with the fluid. A exciting coil 25 is located in the vicinity of the measurement pipe 23 in such a manner as to be capable of impressing a magnetic field on to the fluid within the measurement pipe 23. In the description which follows, the plurality of detector units 20-1-20-n will be referred to simply as 'detector units 20' where there is no need to distinguish between them. The exciting coil 25 is connected directly to between the two lines of the bus-line 21, is impressed with square-wave voltage from the meter board 22 by way of the bus-line 21, and forms a connection through which the exciting current flows. The electromotive force which is generated between the electrodes 24a, 24b of the measurement pipe 23 is amplified in an amplifier 26 and input into a sampling circuit 27. The series of discrete values which is obtained in the sampling circuit 27 is imparted to a signal-processing circuit 29 and converted into a flow-rate signal. Thereafter, processing is implemented digitally.

The detector units 20 have display circuits 30 which display flow-rate signals or cumulative flow-rate signals. A communications circuit 31 possesses a function whereby the flow-rate signals or cumulative flow-rate signals are relayed as an electric message from it by way of the bus-line 21 to the meter board 22.

Power is supplied to each of the circuits of the detector units 20 from a power-supply circuit 28. This power-supply circuit 28 is connected to the bus-line 21, and triggered by changes in the square-wave voltage transmits a sampling timing signal to the sampling circuit 27 after a specified delay. The power-supply circuit 28 transmits a transmission timing signal to the communications circuit 31 in such a manner as to avoid the sampling interval.

Meanwhile, the meter board 22 has a positive voltage source 32 and a negative voltage source 33, and possesses the facility to generate square-wave voltage by connecting these two sources alternately to the bus-line 21. For that reason it is configured in such a manner that the negative terminal of the positive voltage source 32 and the positive terminal of the negative voltage source 33 are each connected simultaneously to one of the lines 21b of the bus-line 21, while the positive terminal of the positive voltage source 32 and the negative terminal of the negative voltage source 33 are connected selectively to the other line 21a of the bus-line 21 with the aid of a switch 34. By using the switch 34 to alter the voltage source which is connected to the bus-line 21 it is possible to impress square-wave voltage on it.

The operation of this switch 34 is controlled by a timing circuit 35, which transmits a transmission or reception timing signal (comprising in this example a transmission timing signal and a reception timing signal) to a communications circuit 36 once a prescribed time has elapsed from a change in the square-wave voltage, and in such a manner as not to interfere with the sampling interval.

The communications circuit 36 has the facility to transmit electric messages based on the transmission or reception timing signal by superimposing them on the square-wave voltage on the bus-line 21, or to receive electric messages from the communications circuits 31 of the detector units 20 superimposed on the square-wave voltage. Flow-rate and other data which the communications circuit 36 receives is displayed detector unit by detector unit on the display circuit 37.

Figure 4:
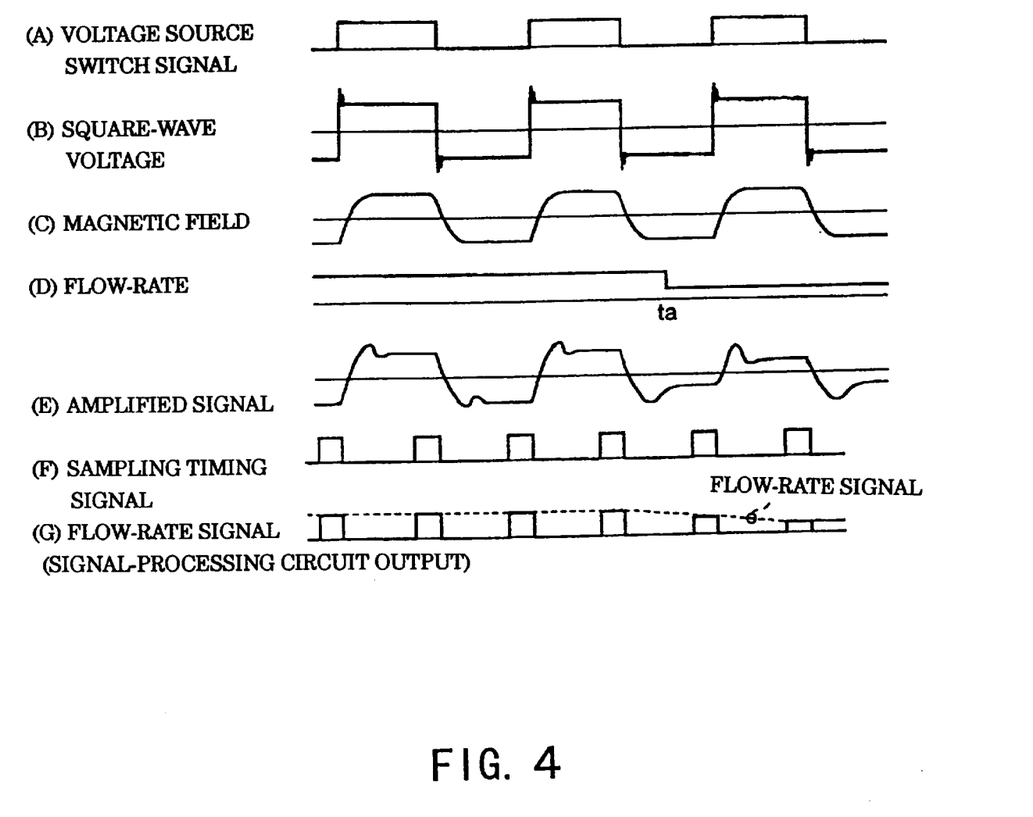
FIG. 4 is a timing chart for each part during acquisition of flow-rate signals in the electromagnetic flow-rate measurement system to which the present invention as illustrated in FIG. 3 pertains.

There follows, with reference to the time charts in FIGS. 3 and 4, a description of the operation of an embodiment configured in the above manner.

Imparting a voltage source switch signal, indicated in FIG. 4 (a) by a dotted line, from the timing circuit 35 in the meter board 22 to the switch 34 causes square-wave voltage to be generated wherein the phase (positive, negative) changes while the frequency remains constant. Square-wave voltage as illustrated in FIG. 4 (b) is generated because the switch 34 causes the source from which the voltage is impressed on the bus-line 21 to switch alternately between the positive voltage source 32 and the negative voltage source 33 at a constant period.

Because a exciting current corresponding to the square-wave voltage flows to the exciting coil 25 which is connected to between the two lines of the bus-line 21, a magnetic field as illustrated in FIG. 4 (c) is generated in the detection units 20, and this magnetic field is impressed on the fluid which flows through the measurement pipe 23 of the detector unit. If at that time a fluid is flowing through the measurement pipe 23 (FIG. 4 (d) illustrates an example of a change in flow-rate), an electromotive force proportional to the mean flow-rate of the said fluid is generated between the electrodes 24a, 24b of the measurement pipe 23. An amplified signal, wherein the output signal corresponding to the electromotive force has been amplified in the amplifier 26a shown in FIG. 4 (e), is output from the said amplifier 26.

In the sampling circuit 27, a sampling timing signal (FIG. 4 (f)) triggered by changes in the square-wave voltage is imparted from the power source circuit 28 in an area delayed in relation to that by a fixed length of time where the amplified signal has stabilised. The same sampling circuit 27 samples the amplifier output in synchronisation with this sampling timing signal. The signal-processing circuit 29 acquires a flow-rate signal which is free from the effect of 90□ noise and direct current noise (noise generated as a result of rendering the exciting current into alternating current, and the electrodes 24a, 24b into batteries), as illustrated in FIG. 4 (g), by subtracting the continuous sampling value imparted from the sampling circuit 27 during the minus phase of the square-wave from that during the plus phase. Flow-rate signals acquired in this manner, or cumulative flow-rate signals obtained from these flow-rate signals, are displayed on the display circuit 30.

Figure 5:
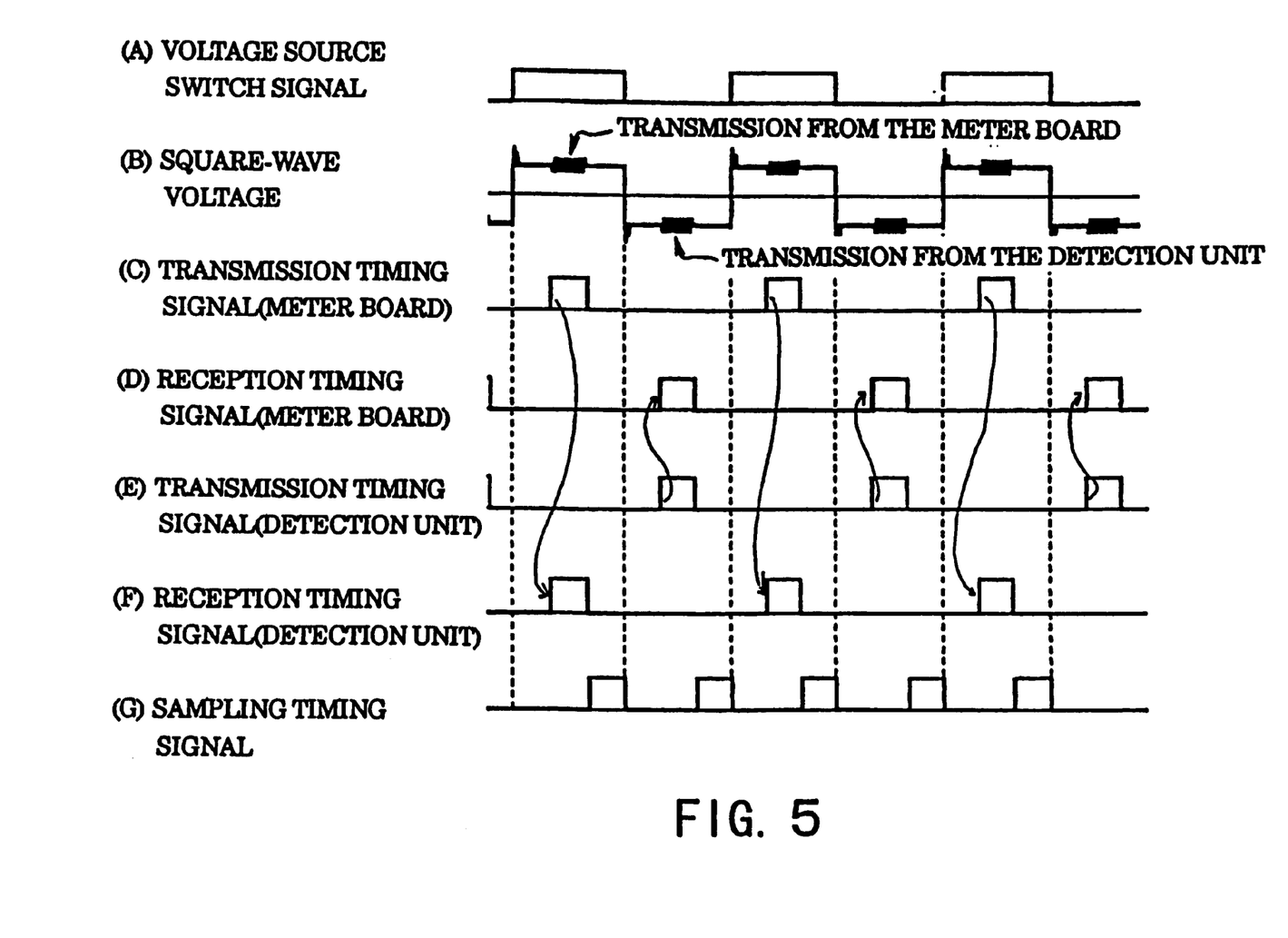
FIG. 5 is a timing chart including communications operations in the electromagnetic flow-rate measurement system to which the present invention as illustrated in FIG. 3 pertains.

FIG. 5 shows the timing of communications between the detector units 20 and the meter board 22.

When the timing circuit 35 connects to the voltage source 32 (constant voltage source) as the one which is connected to the bus-line 21, the meter board imparts a transmission timing signal as illustrated in FIG. 5 (c) to the communications circuit 36 after a prescribed length of time has elapsed from the time of connection and in such a manner as not to coincide with the sampling interval. When a transmission timing signal is input, which is to say when the square-wave voltage on the bus-line (positive side) has stabilised and it does not coincide with the sampling interval, the communications circuit 36 transmits a prescribed electric message to the detector units 20 by superimposing it on the square-wave voltage on the bus-line 21, as is illustrated in FIG. 5 (b). Similarly, when a reception timing signal is input, which is to say when a prescribed length of time has elapsed since the square-wave voltage on the bus-line (negative side) was altered and in such a manner as not to coincide with the sampling interval, the communications circuit 36 receives an electric message superimposed on the square-wave voltage on the bus-line 21, as is illustrated in FIG. 5 (b).

While the negative voltage source 33 is connected to the bus-line 21, a transmission timing signal as indicated in FIG. 5 (e) by a dotted line is imparted by the detection units 20 after a prescribed length of time has elapsed from the time of connection between the power source circuit 28 and the communications circuit 31 and in such a manner as not to coincide with the sampling interval. When the transmission timing signal is input, if a flow-rate signal has been requested, the communications circuit 31 imparts a prescribed electric message consisting of a flow-rate, cumulative flow-rate or other signal to the meter board 22 by superimposing it on the square-wave voltage of the bus-line 21, as illustrated in FIG. 5 (b). Similarly, when a reception timing signal is input, which is to say when a prescribed length of time has elapsed since the square-wave voltage on the bus-line switched to the positive side and in such a manner as not to coincide with the sampling interval (FIG. 5 (g)) the communications circuit 31 receives an electric message superimposed on the square-wave voltage by way of the bus-line 21, as is illustrated in FIG. 5 (b).

Figure 6:
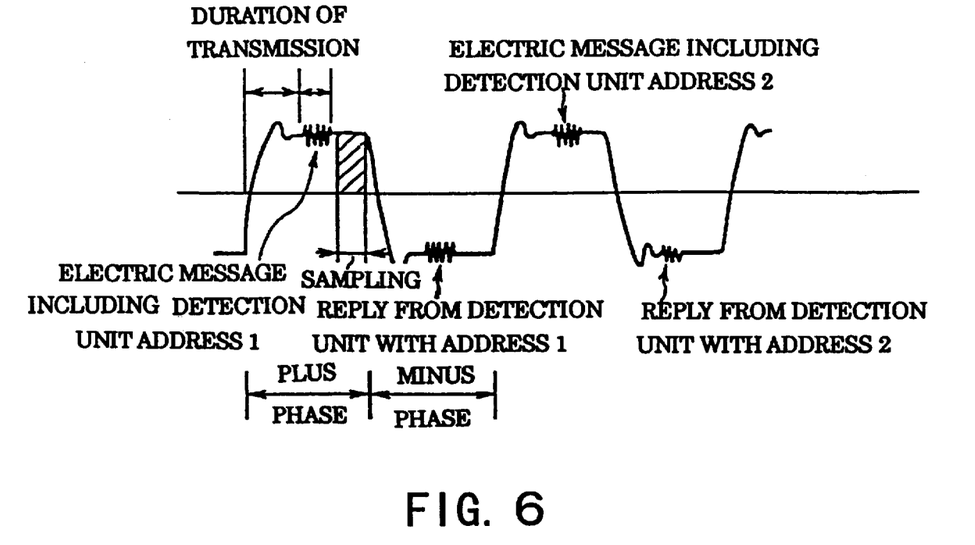
FIG. 6 is a diagram illustrating square-wave voltage waveforms in the electromagnetic flow-rate measurement system to which the present invention as illustrated in FIG. 3 pertains.

For example, where the meter board 22 is to collect cumulative flow-rate signals from all the detector units 20-1-20-n, the communications circuit 36 of the meter board 22 includes in the data which it superimposes on the square-wave voltage (plus phase) an electric message which stipulates the addresses of the detector units from which it is desired to receive cumulative flow-rate values. This electric message is received by all the detector units 20-1-20-n by way of the bus-line 21. If the communications circuit 31 of one of the detector units 20 identifies an address stipulated in the electric message as its own address, it recognises a request for a flow-rate signal, and transmits the cumulative flow-rate value by superimposing it on the minus-phase square-wave voltage when the next transmission timing signal is received. As FIG. 6 shows, the meter board 22 changes the addresses of the detector units one by one whenever the square-wave voltage is switched to the plus phase, and receives cumulative flow-rate signals in the form of electric messages including the address of the detector unit whenever the square-wave voltage is switched to the minus phase. In this way, the meter board 22 is able to collect cumulative flow-rate signals one by one from all the detector units 20-1-20-n. The detector units 20 may also superimpose an electric message including their addresses on the minus phase of the square-wave voltage, and the meter board 22 may receive cumulative flow-rate signals in the form of an electric message whenever the square-wave voltage is switched to the plus phase.

In this manner, by utilising the bus-line 21 between the plurality of detector units 20 and the meter board 22, impressing square-wave voltage on the exciting coil 25 of the detector units 20 from the voltage sources 32, 33 of the meter board 22, and using a specified area of the square-wave voltage for the transmission and reception of the addresses of prescribed detection units and flow-rate signals (data), the present embodiment makes it possible to eliminate wiring for a exciting circuit and power supply. Moreover, by including electromagnetic flowmeters in the detection units 20 and eliminating exciting circuits (voltage sources and switches) from each of the detector units 20, the present embodiment also facilitates reducing the cost of the system as such and reducing the size of the detector units 20. Furthermore, the fact that the square-wave voltage becomes the standard time-base for relaying electric messages means that it is possible for one of the detector units to be sampling signals while the other detector units are transmitting, making it easy to relay electric messages relating to a plurality of detector units because there is no risk of affecting the flow-rate measurement of one of them.

Figure 7:
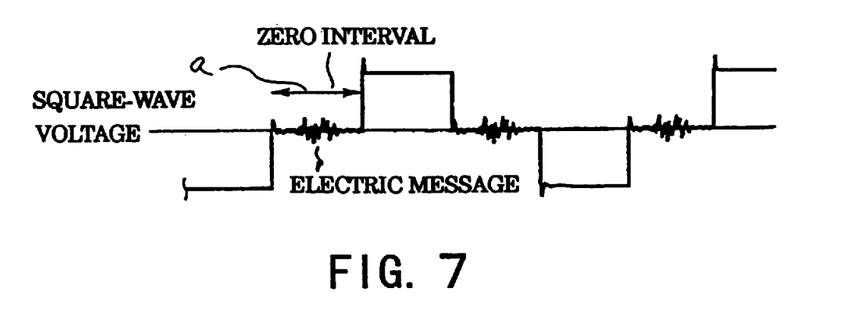
FIG. 7 is a diagram illustrating square-wave voltage waveforms which are used for exciting and communications in the electromagnetic flow-rate measurement system to which the second embodiment of the present invention pertains.

FIG. 7 is a diagram illustrating square-wave voltage waveforms which are used for exciting and communications in the electromagnetic flow-rate measurement system to which the second embodiment of the present invention pertains. The meter board 22 sets a zero interval in the square-wave voltage which is impressed from it to the bus-line 21, and this zero interval is used for communications between the meter board 22 and the detector units 20. In other words, by allowing the timing circuit 35 of the meter board 22 to control the switch 34, a zero interval a is generated which, as the drawing shows, is midway between the plus phase and the minus phase during phase-switching of the square-wave voltage. By retaining the terminal of the switch 34 in an intermediate position for a specified length of time, it is possible to set a zero interval.

In this embodiment, the ability of the timing circuit 35 to detect the zero interval allows it to impart the transmission or reception timing signal to the communications circuit 36 during the zero interval. The detector units 20 judge the timing with which the power source circuit 28 detects the change in the phase of the square-wave voltage and causes a sampling timing signal and transmission or reception timing signal to be generated.

Because the meter board sets a zero interval in the square-wave voltage and this zero interval is used for communications between the meter board and the detector units, this embodiment permits conservation of power over the whole system.

Figure 8:
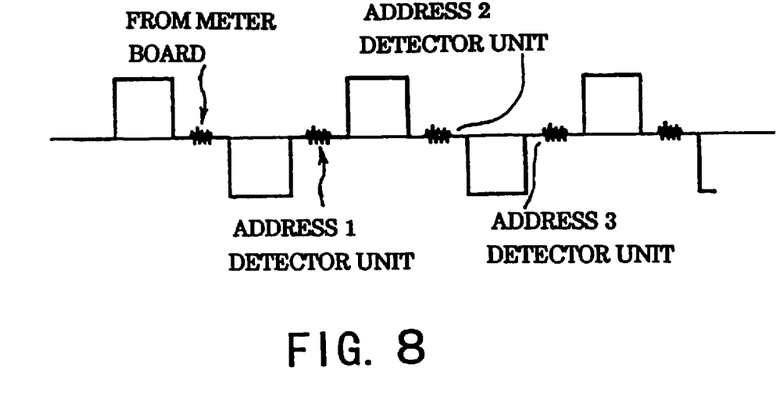
FIG. 8 is a diagram illustrating square-wave voltage waveforms which are used for exciting and communications in the electromagnetic flow-rate measurement system to which the third embodiment of the present invention pertains.

FIG. 8 is a diagram illustrating square-wave voltage waveforms which are used for exciting and communications in the electromagnetic flow-rate measurement system to which the third embodiment of the present invention pertains. The meter board 22 transmits a start signal to all the detector units 20-1-20-n by superimposing it on the square-wave voltage which is impressed from it to the bus-line 21. Each of the detector units 20-1-20-n, having received the start signal, transmits its own flow-rate or other signal to the meter board 22 in a predetermined order every half-cycle by superimposing it on the square-wave voltage. The meter board 22 responds in the abovementioned order to the flow-rate or other signals which are transmitted from the detector units 20 every half-cycle superimposed on the square-wave voltage.

The fact that the meter board 22 predetermines the order of transmission to the detector units 20-1-20-n allows each of the detector units 20-1-20-n to know how many cycles to wait after receiving the start signal before transmitting means that each unit can determine the stand-by time by calculation. By counting the phase changes of the square-wave voltage the detector units 20 are able to detect the order in which they themselves are to transmit.

This embodiment illustrates an example where a square-wave voltage with a zero interval is used to transmit in order according to above.

Because the start signal impressed on the square-wave voltage from the meter board 22 allows a series of transmissions to be implemented every half-cycle, this embodiment makes it possible to shorten the time required to collect data from all the detector units 20-1-20-n as compared with collecting the flow-rate signals by stipulating the detector units individually.

There follows a description of a fourth embodiment.

In this embodiment, sequential transmission triggered by the start signal is adopted for the relaying of all signals apart from electric messages between the meter board 22 and the detector units 20. In other words, addresses for all the detector units 20-1-20-n are set, the address data for the detector units 20 is controlled by the meter board 22, and the detector units 20 transmit one signal per cycle (e.g. the number of pulses which corresponds to the cumulative flow-rate within a specified period) in accordance with a start signal transmitted from the meter board at a given cycle of the square-wave voltage. There is no drawing of this embodiment.

Figure 9:
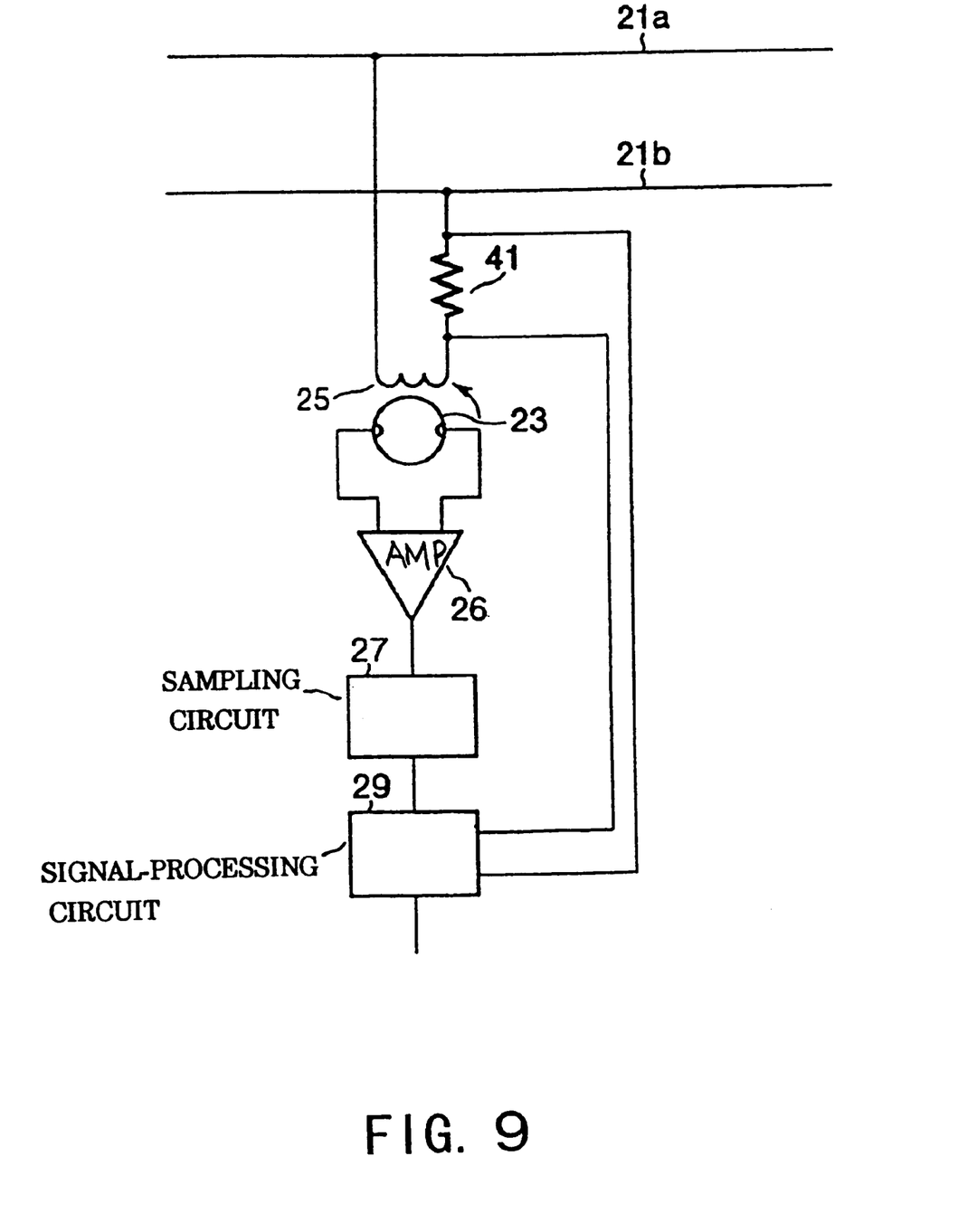
FIG. 9 is a block diagram illustrating part of a detector unit in the electromagnetic flow-rate measurement system to which the fourth embodiment of the present invention pertains.

FIG. 9 is a block diagram illustrating part of a detector unit in the electromagnetic flow-rate measurement system to which the fifth embodiment of the present invention pertains. In the detector units 20, a resistor 41 which detects the exciting current is connected serially with the exciting coil 25 between the two lines of the bus-line 21, and the flow-rate signal is changed in accordance with the magnitude of the exciting current which is detected.

As the drawing shows, the resistor 41 is inserted serially with the exciting coil between the two lines of the bus-line, and both ends of it are connected to the signal-processing circuit 29. This allows a voltage signal proportional to the magnitude of the exciting current flowing in the exciting coil 25 to be input to the signal-processing circuit 29.

Even if the flow-rate of the fluid flowing through the measurement pipe 23 is constant, changes in the strength of the magnetic field impressed on the fluid mean that the electromotive force induced between the electrodes may vary, leading to the output of a flow-rate signal showing the wrong flow-rate. Changing the measurement value in the signal-processing circuit 29 in accordance with the magnitude of the exciting current, which is to say the strength of the magnetic field, ensures that the correct flow-rate value is always obtained.

Figure 10:
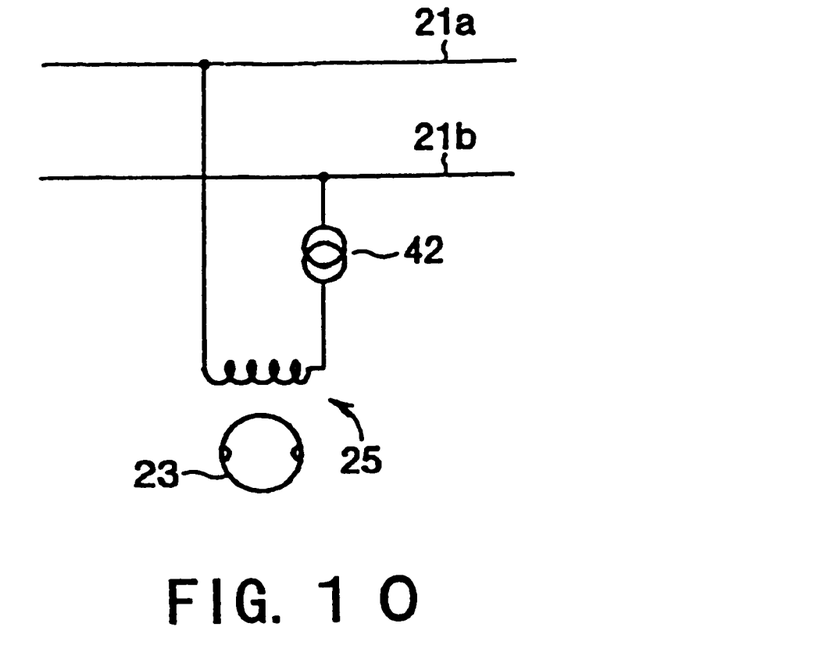
FIG. 10 is a diagram illustrating the configuration of part of a detector unit in the electromagnetic flow-rate measurement system to which the fifth embodiment of the present invention pertains.

FIG. 10 is a diagram illustrating the configuration of part of a detector unit in the electromagnetic flow-rate measurement system to which the sixth embodiment of the present invention pertains.

In the detector units 20, a constant-current circuit is connected serially with the exciting coil 25 between the two lines of the bus-line 21, thus ensuring that the exciting current is kept constant even if the square-wave voltage impressed upon the exciting coil 25 varies.

As the drawing shows, a constant-current circuit 42 is connected serially with the exciting coil 25 between the two lines of the bus-line 21. Connecting the constant-current circuit 24 ensures that the exciting current flowing in the exciting coil 25 is kept constant even if the square-wave voltage varies. It is therefore possible to calculate flow-rate values in the signal-processing circuit 29 with a high degree of reliability unaffected by variations in the square-wave voltage.

Figure 11:
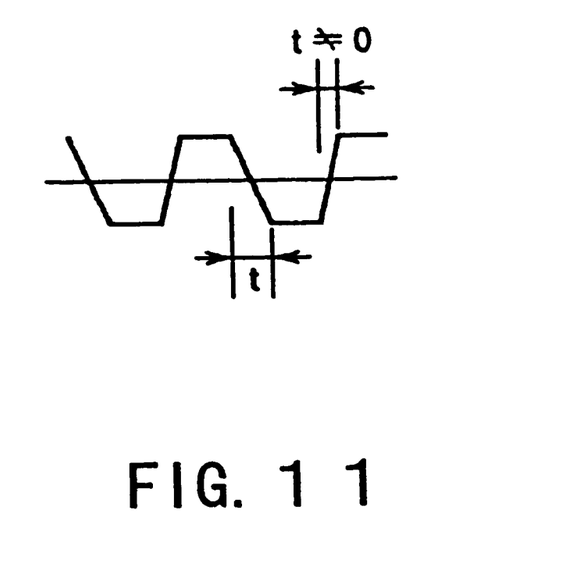
FIG. 11 is a diagram illustrating square-wave voltage waveforms which are used for exciting and communications in the electromagnetic flow-rate measurement system to which the sixth embodiment of the present invention pertains.

FIG. 11 is a diagram illustrating square-wave voltage waveforms which are used for exciting and communications in the electromagnetic flow-rate measurement system to which the seventh embodiment of the present invention pertains. In the abovementioned embodiments the waveform of the alternating-current power supplied from the meter board 22 has been described in terms of square waves, but the present invention is not restricted to square waves. In other words, in this embodiment the square-wave voltage impressed from the meter board 22 on the bus-line 21 is trapezoidal, the phases changing with a prescribed inclination. By adopting trapezoidal-wave voltage in this manner it is possible to reduce power loss in the transformer for obtaining circuit-operating power for the detector units 20. In the drawing, t represents the time required for the start and end of the trapezoidal waveform. t □ 0 shows that this t is not zero.

Figure 12:
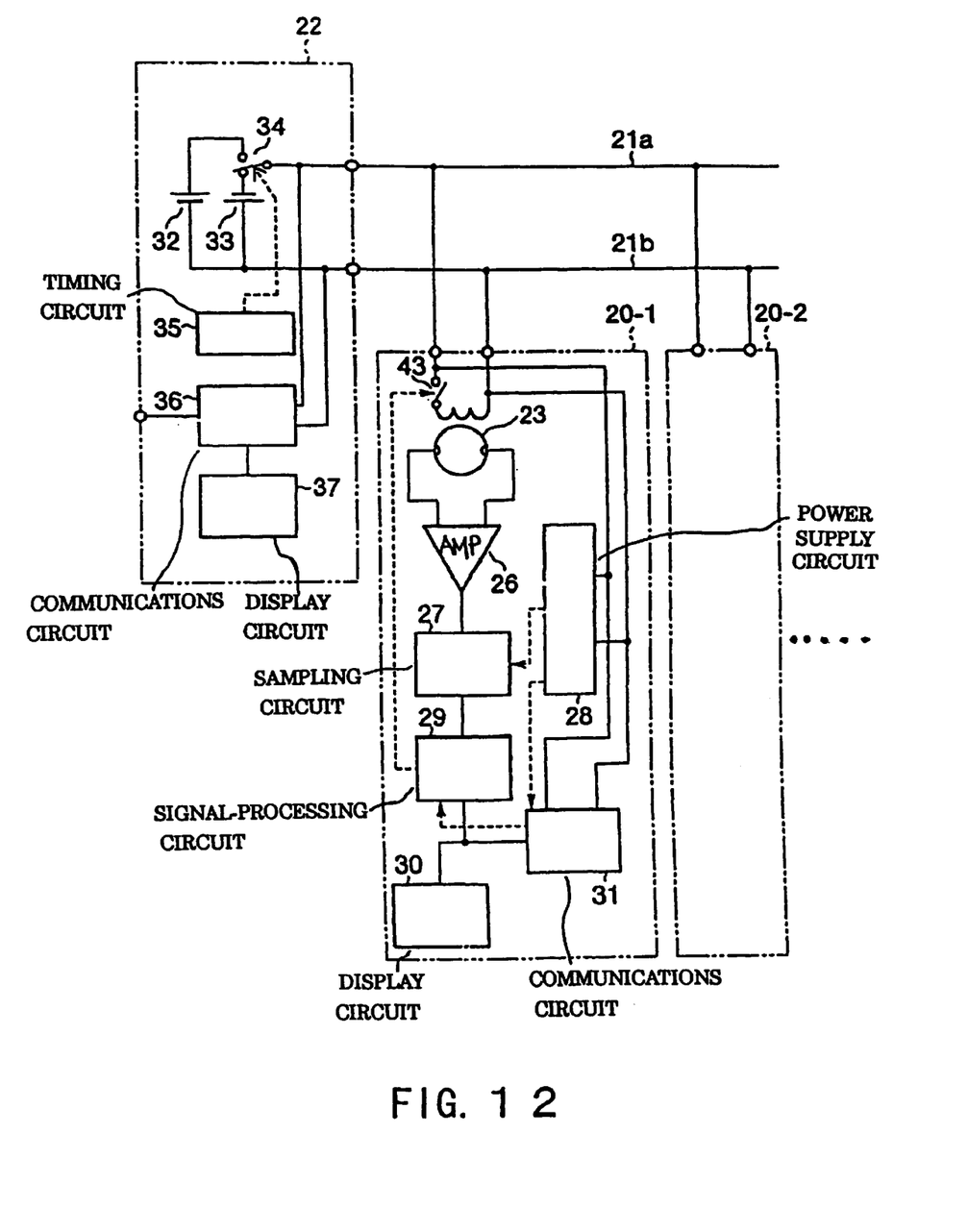
FIG. 12 is a block diagram illustrating the electromagnetic flow-rate measurement system to which the seventh embodiment of the present invention pertains.

FIG. 12 is a block diagram illustrating the electromagnetic flow-rate measurement system to which the eighth embodiment of the present invention pertains. In this drawing, the detection units 20 have a switch 43 connected serially with the exciting coil 25 to between the two lines of the bus-line 21. The operation of opening and closing the switch 43 is performed by the signal-processing circuit 29 on commands received from the meter board 22 by way of the communications circuit 31.

The meter board 22 transmits the command to open the switch 43 to the detector units 20 superimposed on the squarewave voltage. The communications circuit 31 of the detector units 20 notifies the signal-processing circuit 29 of the commands from the meter board 20. The signal-processing circuit 29 opens the switch 43 in accordance with commands from the meter board 22 by way of the signal-processing circuit 29. This results in a cessation of the current flow to the exciting coil 25. It is also possible to close the switch 43 by transmitting a command to close it from the meter board 22 superimposed on the square-wave voltage.

Consequently, it is possible to conserve the amount of power consumed by causing the meter board to give the command to the detector units 20 to close the switch 43 at times when it is not necessary to measure the flow-rate, such as when no-one is at home, or during the night (in the case of offices).

It is also possible to conserve power not only by generating commands to open and close the switch 43 from the meter board 22, but by opening the switch 43 whenever there is no output of a flow-rate signal in the signal-processing circuit 29 for a long period of time.

Obviously numerous additional modifications and variations on the present invention are possible in the light of the above description. It is therefore to be understood that within the scope of the appended claims the invention may be implemented otherwise than as specifically described herein.

The present invention according to above makes it possible to provide a flow-rate measurement system which permits the implementation of a cheap, accurate and durable remote centralised meter-reading system for water meters by configuring it in such a manner that wiring installed for the purpose of remote meter-reading can be used to supply the required power sources for exciting and circuitry.

By 'accurate' here is meant more accurate than mechanical water meters. Moreover, the epithet 'durable' is based on the fact that electromagnetic flowmeters have a life of at least. 20–30 years or more as compared with a mere 8 years or so in the case of mechanical water meters.

What is claimed as new and desired to be secured by Letters Patent of the United States of America is:

1. An electromagnetic flow-rate measurement system for measuring flow-rate values of fluid comprising:
   a plurality of detection units which measure flow-rate values of a fluid, being arranged at a plurality of locations respectively;
   a meter board which collects said flow-rate values of said fluid measured by said plurality of detection units;
   a common bus-line which connects said plurality of detection units with said meter board;
   said plurality of detection units comprising:
      a measurement pipe through which the fluid flows being measured;
      a pair of electrodes attached to the measurement pipe in a latitudinal direction;
      an exciting coil having two ends and is connected to the common bus-line and imparts a magnetic field in a direction which intersects at right-angles to an axial direction of the measurement pipe;
      an amplifier having an output which serves to amplify an electromotive force generated between the electrodes;
      a sampling circuit having an output and sampling the output of the amplifier;
      a signal-processing circuit which acquires flow-rate signals or cumulative flow-rate signals from the output of the sampling circuit;
      a first communications circuit which is connected between the two ends of the exciting coil and serves both to transmit the flow-rate signals or cumulative flow-rate signals to the to the meter board in synchronization with an alternating waveform voltage of the common bus-line, and to receive signals from the meter board in synchronization with the alternating waveform voltage;
   said meter board comprising:
      alternating waveform voltage-generating sources which are connected to the common bus-line and generate the alternating waveform voltage; and
      a second communications circuit which is connected to said common bus-line and serves both to transmit signals to the plurality of detection units in synchronization with the alternating-current waveform voltage, and to receive signals from the plurality detection units in synchronization with the alternating waveform voltage.

2. An electromagnetic flow-rate measurement system according to claim 1, wherein:
   said alternating waveform voltage is square-wave voltage.

3. An electromagnetic flow-rate measurement system according to claim 1, wherein:
   said alternating waveform voltage is trapezoidal-wave voltage.

4. An electromagnetic flow-rate measurement system according to claim 1, wherein:
   each of said plurality of detection units transmits by means of a proportional number of pulses of the flow-rate signals or cumulative flow-rate signals with said alternating waveform voltage in a predetermined order.

5. An electromagnetic flow-rate measurement system according to claim 1, and further comprising:
   a switch which is connected in series with said exciting coil at said plurality of detection units, said switch being opened in response to an instruction from said meter board.

6. An electromagnetic flow-rate measurement system according to claim 1, wherein:
   said alternating waveform voltage-generating sources which generate an alternating waveform voltage having a fixed zero interval during a process of changing opposite polarities, said first and second communications circuits of said plurality of detection units and of said meter board utilizing said zero interval for transmitting signals in synchronization which said alternating waveform voltage.

7. An electromagnetic flow-rate measurement system according to claim 1, and further comprising:

a means for changing said flow-rate signals or cumulative flow-rate signals in response to a magnitude of exciting current flowing in said exciting coil at said plurality of detection units.

8. An electromagnetic flow-rate measurement system according to claim 1, and further comprising:

a constant-current source being connected to said exciting coil in said plurality of detection units, said exciting current flowing being kept constant by said constant-current source.

9. An electromagnetic flow-rate measurement system according to claim 1, and further comprising:

a switch which is connected in series with said exciting coil at said plurality of detection units, said switch being opened by a decision of said signal-processing circuit in response to an instruction from said meter board.

* * * * *